United States Patent [19]

Shigeta et al.

[11] Patent Number: 5,268,779
[45] Date of Patent: Dec. 7, 1993

[54] SPATIAL LIGHT MODULATOR WITH COMPOSITE FILM FORMED BY VAPOR DEPOSITION OF LIGHT BLOCKING SEMICONDUCTOR MATERIAL AND INSULATION MATERIAL

[75] Inventors: Masanobu Shigeta, Yokosuka; Shigeo Shimizu, Yokohama; Toshio Konno, Hoya, all of Japan

[73] Assignee: Victor Company of Japan, Ltd., Yokohama, Japan

[21] Appl. No.: 857,741

[22] Filed: Mar. 26, 1992

[30] Foreign Application Priority Data

Mar. 29, 1991 [JP] Japan .................. 3-092719

[51] Int. Cl.⁵ .................. G02F 1/1335; G02F 1/135
[52] U.S. Cl. .................. 359/67; 359/72
[58] Field of Search .................. 359/72, 67

[56] References Cited

U.S. PATENT DOCUMENTS

| | | | |
|---|---|---|---|
| 4,093,357 | 6/1978 | Jacobson et al. | 359/70 |
| 4,191,454 | 3/1980 | Braatz et al. | 359/67 |
| 4,239,347 | 12/1980 | Braatz et al. | 359/82 |
| 5,084,777 | 1/1992 | Slobodin | 359/72 |
| 5,148,298 | 9/1992 | Shigeta et al. | 359/72 |

FOREIGN PATENT DOCUMENTS 2188201  1/1974  France .

91/07689  5/1991  PCT Int'l Appl. .

OTHER PUBLICATIONS

Kato et al, "Characteristics of a Ferroelectric Liquid Crystal Spatial Light Modulator with a Dielectric Mirror," SPIE Proceedings, vol. 2455 (Feb. 1991), pp. 190-205.

*Primary Examiner*—William L. Sikes
*Assistant Examiner*—Anita Pellman Gross
*Attorney, Agent, or Firm*—Michael N. Meller

[57] ABSTRACT

Spatial light modulator of reflective type having a laminated structure of multiple layers comprising a photoconductive layer on which an information carried by an incident writing light is written, a photomodulation layer which modulates an incident reading light correspondingly with the written information and a composite film made of insulation material and light-blocking material which are chemically non-reactive each other, the composite film is interposed between the photoconductive layer and the photomodulation layer to block the incident reading light passing through the photomodulation layer. The composite film may be formed by evaporating simultaneously an insulation material of $Al_2O_3$ and a light-blocking material of Ge from the respective material sources within a vacuum chamber of physical vapor deposition.

4 Claims, 2 Drawing Sheets

SPATIAL LIGHT MODULATOR WITH COMPOSITE FILM FORMED BY VAPOR DEPOSITION OF LIGHT BLOCKING SEMICONDUCTOR MATERIAL AND INSULATION MATERIAL

BACKGROUND OF THE INVENTION

1. Field of the Invention:

The present invention relates to improvements of spatial light modulator capable of using a high intensity reading light.

2. Description of the Related Art:

Spatial light modulators (SLM) can transform an incoherent light into a coherent light, or vice versa. Application of spatial light modulators to parallel processing of data and to direct arithmatic processing of image has been discussed. If the intensity of light can be amplified, spatial light modulators can be applied in display systems such as video projectors.

Various spatial light modulators of this kind are known as discussed in the APPLIED PHYSICS LETTERS, Vol.22, No. 3, Feb. 1, 1973, pp. 90-92, Preprint for the 50th Meeting (Autumn 1989) of the Japan Society of Applied Physics, 28P-ZD-5-7.

One of such known spatial light modulators is shown as SLM in FIG. 1, in which a first transparent electrode 18, a photoconductive layer 16, a light-blocking layer 14 which is electrically nonconductive, and a dielectric mirror 12 are laminated by deposition on a glass substrate 20 in this order, further, a photomodulation layer 10 using a liquid crystal as a modulation material, is laminated over the dielectric mirror 12, a beam of writing light F1 impinges one side of the photomodulation layer 10 through the above laminated structure from the side of the glass substrate 20.

On the other hand, a second transparent electrode 22 and a glass substrate 24 are laminated on another side of the photomodulation layer 10 on which a reading light F2 impinges. An appropriate driving power supply 26 is connected between the first and second transparent electrodes 18 and 22.

The operation of the spatial light modulator SLM of above structure is now described briefly. The beam of writing light F1 carrying information to be written passes through the glass substrate 20 and the transparent electrode 18 and enters the photoconductive layer 16. As a result, electron-hole pairs are generated in the photoconductive layer 16 corresponding to the intensity distribution of the writing light F1 thereon. Then, these pairs are separated to form an image of electric charge corresponding to the distribution of the intensity of the beam of writing light F1.

On the other hand, the reading light F2 is projected to the photomodulation layer 10 through the glass substrate 24 and the second transparent electrode 22, where the photomodulation layer 10 is subject to an electric field generated by the charge image formed in the photoconductive layer 16 as described above. When the reading light F2 passes the photomodulation layer 10 and reflected back by the dielectric mirror 12 and passes again the photomodulation layer 10 as a reflected light F3, an optical modulation is performed on the beam of reading light F2 modulated in accordance with a two dimensional field strength distribution of the charge image i.e. according to the information carried by the writing light F1.

A function of the light-blocking layer 14 is to prevent the reading light F2 from reaching to the photoconductive layer 16, otherwise the image of electric charge would be disturbed, leading to a reduction in the contrast of read out image.

When such spatial light modulator is used for a video projector, the intensity of the reading light F2 would be much higher than that in the other applications, the higher the intensity of the reading light the more critical thus significant the function of the light-blocking layer 14. For better resolution, the light-blocking layer 14 should be highly resistive electrically and have a high absorption coefficient, which restrict material selections. One of known light blocking films is a CdTe film, but an adequate quality CdTe film is not easily available and is poisonous, a potential problem. There exists a different type of light-blocking film of multiple layers utilizing an optical interference such as disclosed in the Preprint for the 51st Meeting (1990) of the Japan Society of Applied Physics, p. 751 26a-II-3. This type is very effective only in the perpendicularly incident light, but is much less efficient in the obliquely incident light such as from the photomodulation layer 10 of scattering type such as polymer-dispersed liquid crystal. Further, this multi-layer light-blocking film utilizes the interference of light and is wavelength dependent, thus is ineffective in the broad band light when used with a TN-type liquid crystal device.

In the spatial light modulator SLM, the photomodulation layer 10 is driven according to the distribution of the field strength due to the charge image which corresponds to the conductivity variation in the photoconductive layer 16, under such circumstances, if the electrical resistance (a degree of insulation) of the light-blocking layer 14 and/or a reflective layer to reflect the reading light F2 were not high enough, the distribution of the generated electric field would be two dimensionally diluted or deteriorated in a two dimensional directions along the plane (hereinafter called "intraplane") of the photomodulation layer 10 causing a loss of image resolution in the photomodulation layer 10. This is the reason why the mirror 12 is made of dielectric material and the light-blocking film has to be highly resistive.

On those films, the intraplane resistance is the most significant factor for the image resolution, therefore, a simply high insulation in the thickness direction (in the direction perpendicular to the surface of such film) does not suffice for the resolution. In this regard, a light-blocking layer comprised of laminated films of low and high insulation materials respectively does not meet the requirement without having a high intraplane insulation.

One of the attempts to solve the problem is a light-blocking layer 14 disclosed in the Japanese Laid-Open Patent Application No. 56419/1989, in which a metal material is scattered like islands over the film surface by using a mask in the formation process, however, in order to satisfy the resolution requirement, the size of the grain (island) of such granular metal film must be smaller than the pixel, this restricts the manufacture of such films, another attempt is a cermet film composed of metal grains dispersed in a dielectric film such as disclosed in the Japanese Laid-Open Patent Application No. 17867/1979, however, in order to have a high impedance(insulation) film, the metal grains must be so dispersed that they are well apart each other, thus it is difficult to manufacture such films without increasing its thickness substantially.

SUMMARY OF THE INVENTION

Accordingly, a general object of the present invention is to provide a spatial light modulator having no material or manufacturing restrictions described in the foregoing paragraph, but is capable of using a high intensity reading light without causing a degradation of image resolution.

A more specific object of the present invention is to provide a spatial light modulator comprised of a photoconductive layer on which an information carried by an incident writing light is written, a photomodulation layer which modulates an incident reading light correspondingly with the written information and a composite film made of insulation material and light-blocking material which are chemically non-reactive each other, and the film is interposed between the photoconductive layer and the photomodulation layer. The insulation material itself is transparent thus is poor for light blocking, and the light blocking material itself is opaque thus is good for the purpose but is electrically low in resistance, however, the composite film made of the two materials is highly resistive and has a high light blocking function as the light blocking material is uncontinuously dispersed in the intraplane direction for higher intraplane resistance.

Another and more specific object of the present invention is to provide a spatial light modulator using a composite film which may be made by evaporating simultaneously an insulation material of $Al_2O_3$ and a light-blocking material of Ge from the respective material sources within a vacuum chamber of PVD(physical vapor deposition) process.

Other objects and further features of the present invention will be apparent from the following detailed description when read in conjunction with the accompanying drawings in which like numerals refer to like parts.

BRIEF DESCRIPTION OF THE DRAWINGS

Preferred embodiments of the present invention will be described with reference to the accompanying drawings wherein.

DETAILED DESCRIPTION OF THE PREFERRED EMBODIMENT

Figure 1:
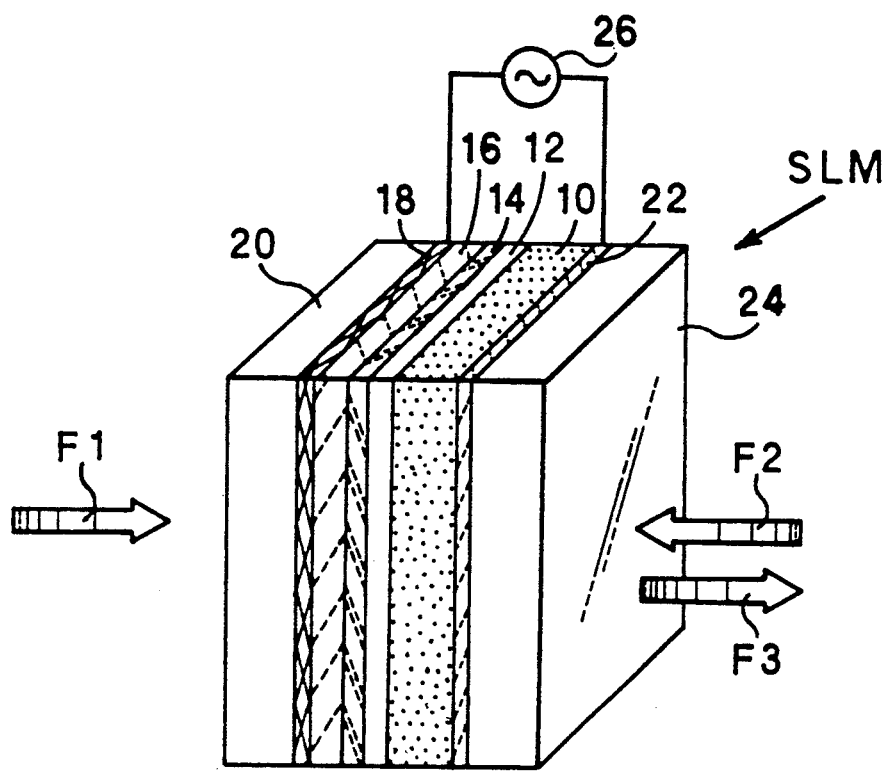
FIG. 1 is a perspective view showing a basic structure of a spatial light modulator common to a conventional one and the present invention.
Figure 2:
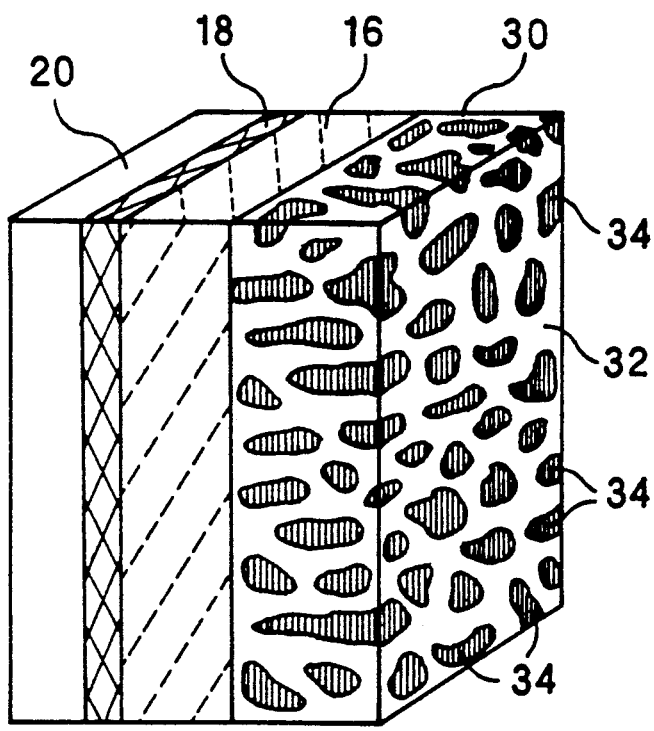
FIG. 2 is a perspective view showing a part of the spatial light modulator of the present invention shown in FIG. 1.

FIG. 2 shows an embodiment of the present invention, in which a light-blocking layer 30 is a composite film made of insulation material 32 having transparent and highly resistive properties and of light-blocking material 34 having low electric resistance by opaque properties such as semiconductor. A basic structure of the spatial light modulator of present invention is like shown in FIG. 1.

Unless they are chemically reactive each other, when such materials 32 and 34 as above are vapor deposited on the photoconductive layer 16 simultaneously in a deposition chamber, a composite film in which the two materials are mixed is obtained, further, if a mixture ratio (volume ratio controlled by respective deposition rates) of the light-blocking material 34 is lower than the insulation material 32, it is possible to obtain a composite film in which the light-blocking material 34 is dispersed in the insulation material 32, further, even when the mixing ratio of the two materials is 1 to 1, it is possible to obtain a composite film in which the light-blocking material 34 is noncontinuous in the intraplane direction by utilizing a nature of each material which tends to grow into a columnar structure.

Accordingly in the light-blocking layer of the present embodiment, the insulation material 32 keeps a high intraplane insulation and the light-blocking material 34 functions an adequate light-blocking performance against the reading light F2.

Following are experiment results related to and in comparison with the present embodiment.

EXAMPLE 1

EXAMPLE 1 is the present embodiment of which an a-Si(amorphous silicon) film of 15 $\mu$m is deposited as the photoconductive layer 16 by a CVD process on the transparent electrode 18 of ITO film preliminary formed on the glass substrate 20, then, over a surface of the photoconductive layer 16, the insulation material 32 of $Al_2O_3$ and the light-blocking material 34 of Ge which are chemically non-reactive each other, and are simultaneously deposited by physical vapor deposition(PVD) from respective sources of the two materials to form the light-blocking layer 30. A deposition rate for the $Al_2O_3$ material is 50 angstrom/s, for the Ge, 20 angstrom/s, and a total film thickness of the light-blocking layer 30 is 1 $\mu$m.

Further on the light-blocking layer 30, the dielectric mirror 12 is formed as such that 5 each $SiO_2$ film of $\lambda/4$ n thickness ($\lambda$ is a wavelength of the reading light e.g. 600 nm, and "n" is a refractive index of the film) and 5 each $TiO_2$ film of $\lambda/4$ n are laminated alternately and on top of the 10-layer lamination, an $SiO_2$ film of $\lambda/2$ n is further laminated all by evaporation.

Finally, the photomodulation layer of 10 $\mu$m composed of a polymer film in which a nematic liquid crystal is dispersed, is interposed between the glass substrate 20 with the layers formed as above and the other glass substrate 24 with the second transparent electrode 22 made of ITO to obtain the spatial light modulator SLM of the present invention as shown in FIG. 1.

EXAMPLE 2

Example 2 is a conventional spatial light modulator in which unlike the light-blocking layer 30 of the Example 1, the light blocking layer 14 of 0.3 $\mu$m is made by evaporating Ge only at a deposition rate of 10 angstrom/s, otherwise the configuration of this spatial light modulator SLM is same as the Example 1.

EXAMPLE 3

Example 3 is a conventional spatial light modulator in which unlike the light-blocking layer 30 of the Example 1, the light blocking layer 14 of 1.6 $\mu$m is made by evaporating Si only at a deposition rate of 3 angstrom/s, the degree of vacuum in this process is $1 \times 10^{-6}$ Torr, otherwise the configuration of this spatial light modulator SLM is same as the Example 1.

EXAMPLE 4

Example 4 is prepared just for a comparison purpose in which the light-blocking layer 14 is completely eliminated, otherwise the configuration of this spatial light modulator SLM is same as the Example 1.

Table 1 shows the film thickness, material and forming process of the respective light-blocking layer 30 or 14 of the Examples 1 through 4.

Resolution and a contrast ratio (the ratio of the maximum brightness to the minimum brightness within an image) were measured on each of the examples by using a monochromatic writing light of 650 nm, and a red reading light having a center wavelength of 600 nm with 80 nm half-width, between which the intensity ratio was 1000:1 at the 650 nm wavelength, the driving frequency (driving frequency of the driving power supply 26) for each of the spatial light modulators, was 5 kHz. Only exception was the Example 4 which allowed to pass such a high intensity light as above, therefore, the intensity of the reading light to measure the resolution on the example 4 was reduced to 1/100. The measurements results are shown in Table 2.

TABLE 1

| Example No. | Thickness, Material & Process |
| --- | --- |
| 1 | 1 μm, $Al_2O_3$ at 50 ang./s Ge at 20 ang./s |
| 2 | 0.3 μm, Ge only at 10 ang./s |
| 3 | 1.6 μm Si only at 3 ang./s |
| 4 | No light-block. layer provider |

TABLE 2

| Example No. | Contrast Ratio | Resolution (μm) |
| --- | --- | --- |
| 1 | 20:1 | 8 |
| 2 | 20:1 | 30 |
| 3 | 5:1 | 15 |
| 4 | — | 8 |

From the foregoing and Table 2, Example 4 which lacks the light-blocking layer 14, can not reproduce an image with a high intensity reading light. Regarding the resolution, Example 1 of the present embodiment has the same resolution as Example 4 has, but the resolutions on Example 2 and 3 are considerably poor. The contrast ratio of Example 1 is equivalent to or better than Example 2 and other examples respectively. Accordingly, the contrast ratio is improved on Example 1 without degrading the resolution. Nearly same results were also obtained with the photomodulation layer 10 made of TN type liquid crystal.

Figure 3:
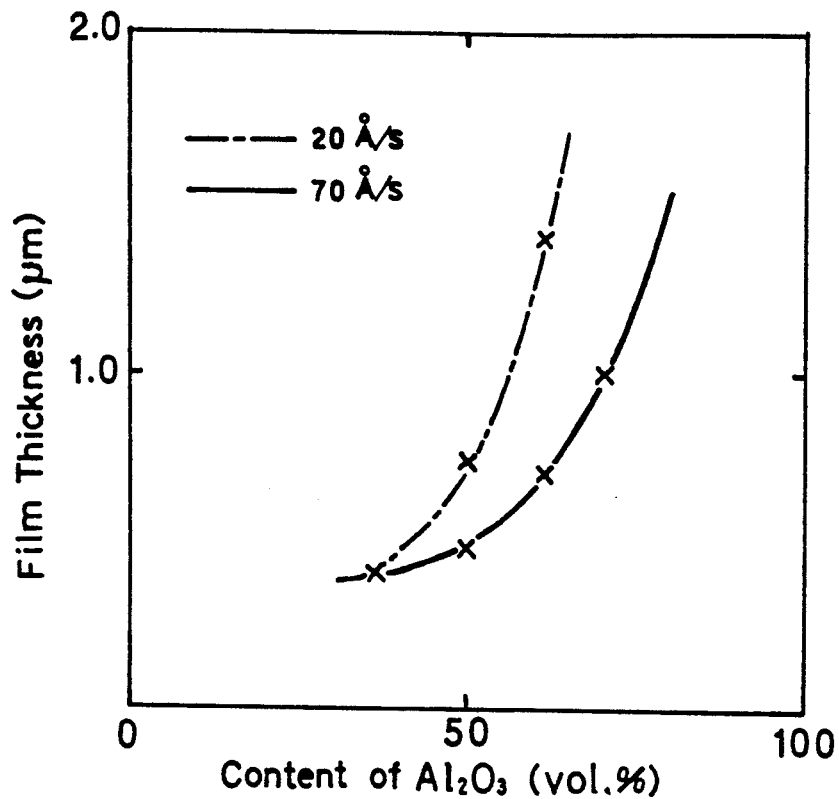
FIG. 3 is a graphical representation indicating the deposited film thickness of the light-blocking layer shown in FIG. 2 in relation to the film deposition rate and the material contents.
Figure 4:
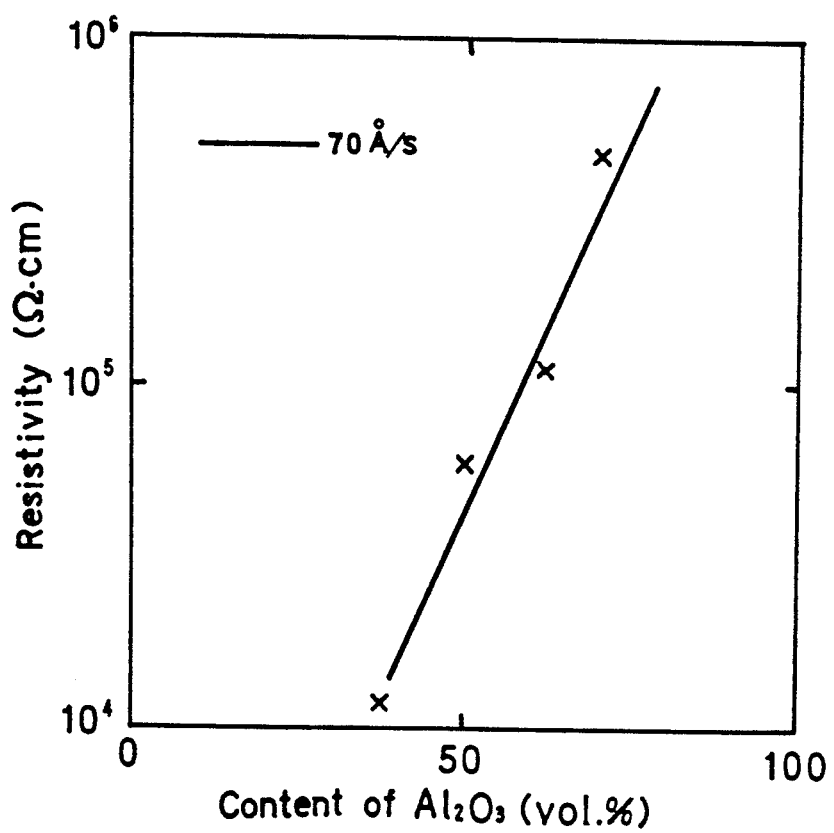
FIG. 4 is a graphical representation indicating the resistivity of the light-blocking layer shown in FIG. 2 in relation to the material contents.

Further, characteristics of the light-blocking layer of the present invention in relation to the film formation process and the material contents have been investigated as shown in FIGS. 3 and 4. The deposition rate is changed as two different conditions i.e. 20 angstroms/s and 70 angstroms/s (sum of the respective deposition rates of $Al_2O_3$ and Ge materials), and the mixture ratio between the 2 materials i.e. the $Al_2O_3$ content is also changed to find the resultant film thickness which presents the light blocking layer having an optical density OD = 2.0 at a wavelength λ = 650 nm. The investigation result is shown in FIG. 3 in which the vertical axis indicates the film thickness, the horizontal the mixture ratio represented by an $Al_2O_3$ content by volume, the one dot chain line represents the total deposition rate of 20 angstroms/s, and the solid line the total deposition rate of 70 angstroms/s. It can be said from FIG. 3, that for a given mixture ratio, the higher (70 angstrom/s) the deposition rate the thinner the film thickness which gives the same (2.0) optical density, in other words, the thinner film thickness serves the purpose. In this regard, when the thickness is required to be no more than 1.5 μm in order to keep the SLM's resolution over a certain level, the optimum $Al_2O_3$ content would require less than 80% with the 70 angstrom/s deposition rate.

FIG. 4 shows the intraplane resistivity measured on the samples represented by the solid line (70 angstroms/s deposition rate) in FIG. 3. Compared with the Example 3 of Si film only on which the resistivity is measured to be $5 \times 10^4$ Ωcm, the $Al_2O_3$ content of 50% or more will be satisfactory to serve the purpose.

As described in the foregoing, according to the present embodiment, a desirable spatial light modulator SLM having a light-blocking layer 30 of high intraplane resistance is obtained, of which no degradation of contrast ratio nor of resolution develops by a high intensity reading light, further, the light-blocking layer 30 is a composite product made from the insulation material 32 and the light-blocking material 34, thus is not much subject to material and/or manufacturing restrictions.

The spatial light modulator of the present invention is not limited to the embodiment disclosed in the foregoing, for instance, an additional light reflecting layer may be combined to the light-blocking layer 30 or such light-blocking layer may be used as a high refraction layer of the dielectric mirror 12 or a part of the high refraction layer, by doing so, the reduction of contrast ratio due to the reading light passing through to the photomodulation layer 16, is further prevented well.

What is claimed is:

1. Spatial light modulator of reflective type having a laminated structure of multiple layers comprising a photoconductive layer on which an information carried by an incident writing light is written, a photomodulation layer which modulates an incident reading light correspondingly with a written information by the writing light, and a composite film formed by physical vapor deposition, said composite film being made of an insulation material and a light-blocking material made of a semiconductor which are chemically not reactive with each other, said composite film being interposed between the photoconductive layer and the photomodulation layer.

2. Spatial light modulator of reflective type as in claim 1, in which said insulation material is $Al_2O_3$ and said light-blocking material is Ge.

3. Spatial light modulator of reflective type having a laminated structure of multiple layers comprising a photoconductive layer on which an information carried by an incident writing light is written, a photomodulation layer which modulates an incident reading light correspondingly with a written information by the writing light, and a composite film formed by physical vapor deposition, said composite film being made of an insulation material and a light-blocking material which are chemically not reactive with each other, said composite film being interposed between the photoconductive layer and the photomodulation layer, wherein said composite film is made by evaporating simultaneously said insulation material and said light-blocking material from respective sources of the insulation material and the light-blocking material within a vacuum chamber of the physical vapor deposition.

4. Spatial light modulator of reflective type as in claim 3, in which said insulation material is $Al_2O_3$ and said light-blocking material is Ge.

* * * * *